United States Patent
Jin et al.

(10) Patent No.: US 10,080,197 B2
(45) Date of Patent: *Sep. 18, 2018

(54) METHOD FOR SINGLE CARD DUAL STANDBY USER EQUIPMENT TO CAMP ON NETWORK AND USER EQUIPMENT

(71) Applicant: HUAWEI DEVICE (DONGGUAN) CO., LTD., Dongguan (CN)

(72) Inventors: Hui Jin, Beijing (CN); Xiaopeng Zhang, Xi'an (CN); Rui Wang, Shenzhen (CN); Shuiping Long, Beijing (CN)

(73) Assignee: HUAWEI DEVICE (DONGGUAN) CO., LTD., Dongguan (CN)

( * ) Notice: Subject to any disclaimer, the term of this patent is extended or adjusted under 35 U.S.C. 154(b) by 15 days.

This patent is subject to a terminal disclaimer.

(21) Appl. No.: 15/185,436

(22) Filed: Jun. 17, 2016

(65) Prior Publication Data

US 2016/0295506 A1 Oct. 6, 2016

Related U.S. Application Data

(63) Continuation of application No. 14/142,009, filed on Dec. 27, 2013, now Pat. No. 9,398,538, which is a (Continued)

(30) Foreign Application Priority Data

Dec. 23, 2011 (CN) .......................... 2011 1 0439545

(51) Int. Cl.
H04W 52/02 (2009.01)
H04J 11/00 (2006.01)
(Continued)

(52) U.S. Cl.
CPC .......... *H04W 52/028* (2013.01); *H04J 11/00* (2013.01); *H04L 69/28* (2013.01); *H04W 36/14* (2013.01);
(Continued)

(58) Field of Classification Search
CPC ......... H04J 11/00; H04L 69/28; H04W 36/14; H04W 48/16; H04W 52/0222;
(Continued)

(56) References Cited

U.S. PATENT DOCUMENTS 8,462,746 B2 * 6/2013 Bitran ................... H04L 5/0087
370/329
8,880,049 B2 * 11/2014 Furuta ....................... G06F 8/65
455/418

(Continued)

FOREIGN PATENT DOCUMENTS

CN 101448305 6/2009
CN 101472310 7/2009
(Continued)

OTHER PUBLICATIONS

PCT International Search Report and Written Opinion of the International Searching Authority dated Oct. 4, 2012 in corresponding International Patent Application No. PCT/CN2012/071736.
(Continued)

*Primary Examiner* — Babar Sarwar
(74) *Attorney, Agent, or Firm* — Staas & Halsey LLP (57) ABSTRACT

Embodiments of the present invention disclose a method for a single card dual standby user equipment to camp on a network and a user equipment, so as to reduce power consumption of a user equipment. The method in the embodiment of the present invention includes: when a circuit switched domain CS domain of a UE camps on a second-generation mobile communications technology
(Continued)

2G/third-generation mobile communications technology 3G network and a packet switched domain PS domain camps on a long term evolution LTE network, executing, by the UE, a routing area update process of the PS domain of the 2G/3G network if the UE meets a preset first condition, so as to make the PS domain of the UE camp on the 2G/3G network; and after the PS domain of the UE camps on the 2G/3G network, turning off an LTE radio frequency unit.

8 Claims, 4 Drawing Sheets

Related U.S. Application Data continuation of application No. PCT/CN2012/071736, filed on Feb. 28, 2012.

(51) Int. Cl.
*H04W 60/00* (2009.01)
*H04W 68/02* (2009.01)
*H04W 68/12* (2009.01)
*H04L 29/06* (2006.01)
*H04W 36/14* (2009.01)
*H04W 48/16* (2009.01)
*H04W 64/00* (2009.01)
*H04W 76/16* (2018.01)
*H04W 88/06* (2009.01)

(52) U.S. Cl.
CPC ....... *H04W 48/16* (2013.01); *H04W 52/0222* (2013.01); *H04W 52/0274* (2013.01); *H04W 60/00* (2013.01); *H04W 60/005* (2013.01); *H04W 64/003* (2013.01); *H04W 68/02* (2013.01); *H04W 68/12* (2013.01); *H04W 76/16* (2018.02); *H04W 88/06* (2013.01); *Y02D 70/00* (2018.01); *Y02D 70/124* (2018.01); *Y02D 70/1224* (2018.01); *Y02D 70/1262* (2018.01); *Y02D 70/23* (2018.01)

(58) Field of Classification Search
CPC ........... H04W 52/0274; H04W 52/028; H04W 60/00; H04W 60/005; H04W 64/003; H04W 68/02; H04W 68/12; H04W 76/026; H04W 88/06; Y02B 60/50
See application file for complete search history.

(56) References Cited

U.S. PATENT DOCUMENTS

| 8,908,642 | B2* | 12/2014 | Nishida | H04W 36/0022 370/331 |
|---|---|---|---|---|
| 9,007,972 | B2* | 4/2015 | Gupta | H04W 52/0225 370/252 |
| 2008/0102831 | A1* | 5/2008 | Ore | H04W 60/02 455/435.1 |
| 2010/0056156 | A1* | 3/2010 | Xu | H04W 12/04 455/436 |
| 2010/0099393 | A1* | 4/2010 | Brisebois | H04M 15/00 455/418 |
| 2010/0142483 | A1* | 6/2010 | Wu | H04M 15/00 370/331 |
| 2010/0195643 | A1* | 8/2010 | Kodali | H04W 48/18 370/352 |
| 2011/0059739 | A1* | 3/2011 | Huang | H04W 48/18 455/435.1 |
| 2011/0216645 | A1* | 9/2011 | Song | H04W 36/0022 370/216 |
| 2011/0256873 | A1* | 10/2011 | Vikberg | H04W 60/04 455/436 |
| 2012/0064896 | A1* | 3/2012 | Guo | H04W 36/0066 455/436 |
| 2012/0252443 | A1* | 10/2012 | Zheng | H04W 48/18 455/426.1 |
| 2013/0012211 | A1* | 1/2013 | Sander | H04W 36/0022 455/438 |
| 2013/0051368 | A1* | 2/2013 | Liu | H04W 36/0022 370/331 |
| 2013/0235847 | A1* | 9/2013 | Li | H04W 48/18 370/331 |
| 2013/0288686 | A1* | 10/2013 | Chou | H04N 21/2365 455/436 |
| 2014/0187234 | A1* | 7/2014 | Chou | H04W 52/0206 455/422.1 |

FOREIGN PATENT DOCUMENTS

| CN | 101754472 | 6/2010 |
|---|---|---|
| CN | 101834934 | 9/2010 |
| CN | 101977417 | 2/2011 |
| CN | 101984714 | 3/2011 |
| CN | 102231902 | 11/2011 |
| CN | 102256239 | 11/2011 |
| EP | 2621216 | 7/2013 |
| WO | 2008/058877 | 5/2008 |

OTHER PUBLICATIONS

Extended European Search Report dated Jul. 25, 2014 in corresponding European Patent Application No. 12737138.3.
Office Action dated Oct. 5, 2015 in related U.S. Appl. No. 14/142,009.
Notice of Allowance dated Mar. 17, 2016 in related U.S. Appl. No. 14/142,009.
U.S. Appl. No. 14/142,009, filed Dec. 27, 2013, Hui Jin et al., Huawei Device Co., Ltd.

* cited by examiner

METHOD FOR SINGLE CARD DUAL STANDBY USER EQUIPMENT TO CAMP ON NETWORK AND USER EQUIPMENT

CROSS-REFERENCE TO RELATED APPLICATIONS

This application is a continuation of U.S. patent application Ser. No. 14/142,009, filed on Dec. 27, 2013, which is a continuation of International Application No. PCT/CN2012/071736, filed on Feb. 28, 2012, which claims priority to Chinese Patent Application No. 201110439545.9, filed on Dec. 23, 2011, all of which are hereby incorporated by reference in their entireties.

TECHNICAL FIELD

The present invention relates to the field of mobile communications technologies, and in particular, to a method for a single card dual standby user equipment to camp on a network and a user equipment.

BACKGROUND

In the prior art, a second-generation mobile communications technology (2G, Second Generation)/third-generation mobile communications technology (3G, Third Generation) network supports both a circuit switched domain (CS domain, Circuit Switched Domain) and a packet switched domain (PS domain, Packet switched Domain), but a long term evolution (LTE, Long Term Evolution) network only provides a PS domain Currently, mainly a CS domain provides common voice services and short message services, and mainly a PS domain provides data services. The voice services are dominant services for mobile carriers currently. As the technologies of voice over mobile networks (VOIP, Voice over Internet Protocol) are not mature yet, a CS domain is still to bear voice services for a very long time in the future.

With the development of technologies, an LTE technology began to be used. The absence of a CS domain in an LTE system makes it difficult to effectively support voice services and short message services. Meanwhile, the 2G/3G network has undergone long-term construction and has good network coverage, and it is impossible to abandon this network in a short term. Therefore, in the future a carrier requires a user equipment (UE, User Equipment) to be capable of being attached to both a 2G/3G network and an LTE network, and a single card dual standby UE is such a UE. The single card dual standby UE adopts two antennas and two radio frequency modules, so that the single card dual standby UE is capable of being attached to both a 2G/3G network and an LTE network. In addition, to prevent increase of location update signaling caused by frequent movement of the UE between different systems, a network side may support an idle mode signaling reduction (ISR, Idle Mode Signalling Reduction) mechanism.

A basic concept of a signaling reduction solution is as follows: For a 2G/3G and an LTE/system architecture evolution (SAE, System Architecture Evolution) adjacent to each other, a routing area of the 2G/3G and a tracking area of the LTE/SAE are set as equivalent location areas. When a UE enters an access system, registration is performed according to a common registration/update procedure. The network allocates a temporary identifier and a location area identifier for the UE. When the network side supports the ISR mechanism, a location area update process is initiated if the UE enters another access system, and the network allocates the temporary identifier and the location area identifier of the new system. At this time, core network nodes that provide services for the UE in the two systems register with a home subscriber server (HSS, Home Subscriber Server), and at the same time provide services for the UE. However, when the UE moves between the two systems again, with the presence of an association relationship, the registration/update process no longer needs to be initiated, so that the objective of reducing route update signaling is achieved.

However, when the UE currently does not have a data service or data traffic is low, the UE also needs to be attached to both the 2G/3G network and the LTE network. Two radio frequencies are turned on, power consumption is large, and user experience is degraded.

SUMMARY

Embodiments of the present invention provide a method for a single card dual standby user equipment to camp on a network and a user equipment, so as to effectively reduce power consumption of a UE and improve user experience.

A method for a single card dual standby user equipment to camp on a network in the embodiment of the present invention includes:

when a circuit switched domain CS domain of a UE camps on a second-generation mobile communications technology 2G/third-generation mobile communications technology 3G network and a packet switched domain PS domain camps on a long term evolution LTE network, executing, by the UE, a routing area update process of the PS domain of the 2G/3G network if the UE meets a preset first condition, so as to make the PS domain of the UE camp on the 2G/3G network; and after the PS domain of the UE camps on the 2G/3G network, turning off an LTE radio frequency unit.

The preset first condition is that data traffic sent and/or received within a preset first period of time is smaller than or equal to a preset first value, or the preset first condition is that an average data at which data is sent and/or received within a preset second period of time is smaller than or equal to a preset second value.

That the UE meets a preset first condition includes:

the data traffic sent and/or received by the UE within the preset first period of time is smaller than or equal to the preset first value, or at which data is sent and/or received the average data rate at which the UE sends and/or receives data within the preset second period of time is smaller than or equal to the preset second value.

A user equipment in the embodiment of the present invention includes:

an update unit, configured to: when a circuit switched domain CS domain of a UE camps on a second-generation mobile communications technology 2G/third-generation mobile communications technology 3G network and a packet switched domain PS domain camps on a long term evolution LTE network, execute a routing area update process of the PS domain of the 2G/3G network if the UE meets a preset first condition, so as to make the PS domain of the UE camp on the 2G/3G network; and a radio frequency turn-off unit, configured to: after the update unit makes the PS domain of the UE camp on the 2G/3G network, turn off an LTE radio frequency unit.

The preset first condition is that data traffic sent and/or received within a preset first period of time is smaller than or equal to a preset first value, or the preset first condition is that an average data at which data is sent and/or received within a preset second period of time is smaller than or equal to a preset second value.

That the UE meets a preset first condition includes:

the data traffic sent and/or received by the UE within the preset first period of time is smaller than or equal to the preset first value, or at which data is sent and/or received the average data rate at which the UE sends and/or receives data within the preset second period of time is smaller than or equal to the preset second value.

It may be seen from the foregoing technical solutions that the embodiments of the present invention have the following advantages:

When a CS domain of a UE camps on a 2G/3G network and a PS domain camps on an LTE network, the UE executes a routing area update process of the PS domain of the 2G/3G network if the UE meets a preset first condition, so as to make the PS domain of the UE camp on the 2G/3G network, and turns off an LTE radio frequency unit, so that the UE is capable of, through turning off the LTE radio frequency unit, achieving the object of reducing power consumption of the UE and improving user experience.

DESCRIPTION OF EMBODIMENTS

Embodiments of the present invention provide a method for a single card dual standby user equipment to camp on a network and a user equipment, so as to turn off an LTE radio frequency unit to reduce power consumption of a UE and improve user experience.

Figure 1:
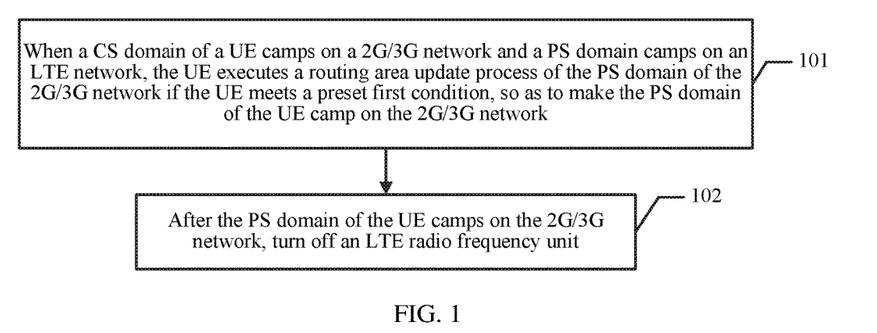
FIG. 1 is a schematic diagram of a method for a single card dual standby user equipment to camp on a network according to an embodiment of the present invention.

Referring to FIG. 1, FIG. 1 shows a method for a single card dual standby user equipment to camp on a network according to an embodiment of the present invention, which includes:

101. When a CS domain of a UE camps on a 2G/3G network and a PS domain camps on an LTE network, the UE executes a routing area update process of the PS domain of the 2G/3G network if the UE meets a preset first condition, so as to make the PS domain of the UE camp on the 2G/3G network.

In the embodiment of the present invention, if the CS domain of the UE camps on the 2G/3G network and the PS domain camps on the LTE network, and both a 2G/3G radio frequency unit and an LTE radio frequency unit are turned on, the UE determines whether the preset first condition is met. The UE executes the routing area update process of the PS domain of the 2G/3G network if the UE meets a preset first condition, so as to make the PS domain of the UE camp on the 2G/3G network.

In the embodiment of the present invention, when the preset first condition is that data traffic sent and/or received within a preset first period of time is smaller than or equal to a preset first value, that the UE meets a preset first condition includes: the data traffic sent and/or received by the UE within the preset first period of time is smaller than or equal to the preset first value; and when the preset first condition is that an average data at which data is sent and/or received within a preset second period of time is smaller than or equal to a preset second value, that the UE meets a preset first condition includes: at which data is sent and/or received the average data rate at which the UE sends and/or receives data within the preset second period of time is smaller than or equal to the preset second value.

102. After the PS domain of the UE camps on the 2G/3G network, turn off the LTE radio frequency unit.

In the embodiment of the present invention, after the PS domain of the UE camps on the 2G/3G network, the UE turns off the LTE radio frequency unit to save power. After the UE turns off the LTE radio frequency unit, the CS domain and PS domain of the UE both camp on the 2G/3G network.

In the embodiment of the present invention, when the CS domain of the UE camps on the 2G/3G network and the PS domain camps on the LTE network, the UE executes the routing area update process of the PS domain of the 2G/3G network if the UE meets a preset first condition, and turns off the LTE radio frequency unit to make the CS domain and PS domain of the UE both camp on the 2G/3G network and to keep the LTE radio frequency unit turned off, thereby reducing power consumption of the UE and improving user experience.

Figure 2:
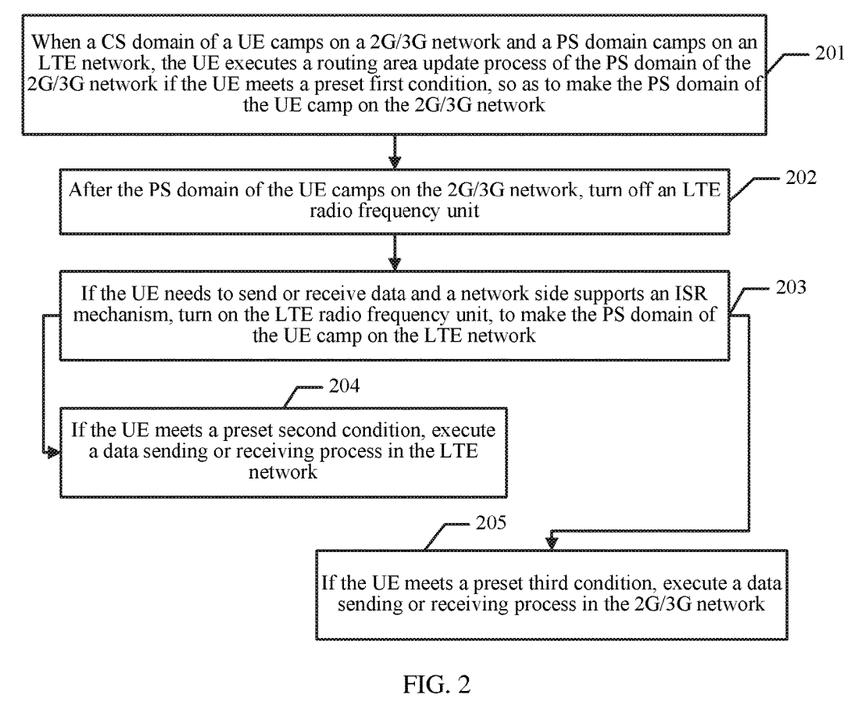
FIG. 2 is another schematic diagram of a method for a single card dual standby user equipment to camp on a network according to an embodiment of the present invention.

To better understand the technical solution of the present invention, referring to FIG. 2, FIG. 2 shows a method for a single card dual standby user equipment to camp on a network according to another embodiment of the present invention, which includes:

201. When a CS domain of a UE camps on a 2G/3G network and a PS domain camps on an LTE network, the UE executes a routing area update process of the PS domain of the 2G/3G network if the UE meets a preset first condition, so as to make the PS domain of the UE camp on the 2G/3G network.

In the embodiment of the present invention, when the CS domain of the UE camps on the 2G/3G network and the PS domain camps on the LTE network, the UE executes the routing area update process initiated by the PS domain of the 2G/3G network if the UE meets a preset first condition, so as to make the PS domain of the UE camp on the 2G/3G network.

In the embodiment of the present invention, when the preset first condition is that data traffic sent and/or received within a preset first period of time is smaller than or equal to a preset first value, that the UE meets a preset first condition includes: the data traffic sent and/or received by the UE within the preset first period of time is smaller than or equal to the preset first value; and when the preset first condition is that an average data at which data is sent and/or received within a preset second period of time is smaller than or equal to a preset second value, that the UE meets a preset first condition includes: at which data is sent and/or received the average data rate at which the UE sends and/or receives data within the preset second period of time is smaller than or equal to the preset second value.

It should be noted that, the cases of making the CS domain of the UE camp on the 2G/3G network and the PS domain camp on the LTE network include: When the UE is initially connected to the network, the UE sends, according to the method in the prior art, an attach request to a serving general packet radio service support node (SGSN, Serving GPRS SUPPORT NODE) on the 2G/3G network to perform an attach process of the CS domain of the 2G/3G network, and sends, according to the method in the prior art, an attach request to a packet data network gateway (PDN GW, Packet Data Network Gateway) to perform the attach process of the PS domain of the LTE network. The PDN GW allocates an Internet Protocol (IP, Internet Protocol) address to the UE. After the UE completes the attach processes to the 2G/3G network and the LTE network, the UE makes the CS domain camp on the 2G/3G network and the PS domain camp on the LTE network. Alternatively, to complete data sending or receiving in the LTE network, the UE makes the CS domain camp on the 2G/3G network and the PS domain camp on the LTE network. Therefore, in the embodiment of the present invention, the UE checks a current network state of the UE, and determined the network for the UE to camp on.

It should be noted that, in the embodiment of the present invention, before the UE executes the routing area update process of the PS domain of the 2G/3G network, the UE has completed, according to the method in the prior art, a detach process of the PS domain of the LTE network. The specific manner is no longer repeated here.

In the embodiment of the present invention, after the UE camps on the PS domain of the 2G/3G network, a network parameter of the UE in the LTE network may be saved.

It should be noted that, in the embodiment of the present invention, after the PS domain of the UE camps on the 2G/3G network, the network parameter of the UE in the LTE network may be saved, so as to enable the UE to perform network capture according to the network parameter of the UE in the LTE network when the UE turns on an LTE radio frequency unit the next time, thereby effectively shortening the time for the UE to perform network capture. At the same time, it should be noted that, in practical applications, the UE may also choose to perform the network capture of the LTE network in the case that the network parameter of the UE in the LTE network is not saved.

202. After the PS domain of the UE camps on the 2G/3G network, turn off the LTE radio frequency unit.

In the embodiment of the present invention, after the PS domain of the UE is switched from the LTE network to the 2G/3G network, the UE turns off the LTE radio frequency unit.

203. If the UE needs to send or receive data, and a network side supports an ISR mechanism, turn on the LTE radio frequency unit to make the PS domain of the UE camp on the LTE network.

In the embodiment of the present invention, if the UE needs to send or receive data, and the network side supports the ISR mechanism, the UE turns on the LTE radio frequency unit to make the PS domain of the UE camp on the LTE network. At this time, the CS domain of the UE camps on the 2G/3G network, and the PS domain camps on both the 2G/3G network and the LTE network.

It should be noted that, in the embodiment of the present invention, description is performed by taking the network side supporting the ISR mechanism as an example That is, in the case that the network side supports the ISR mechanism, the UE performs step 203, where the network side supporting the ISR mechanism refers to both the 2G/3G network and the LTE network support the ISR mechanism.

In the embodiment of the present invention, if either the 2G/3G network or the LTE network does not support the ISR mechanism, the network side does not support the ISR mechanism. In the case that the network side does not support the ISR mechanism, step 203 is changed to: if the UE needs to send or receive data, turn on the LTE radio frequency unit, and the UE initiates a tracking area update (TAU, Tracking Area Update) request to a mobility management entity (MME, Mobility Management Entity) on the LTE network, so as to make the PS domain of the UE camp on the LTE network.

It should be noted that, in the embodiment of the present invention, an ISR indicator is saved in the UE. The ISR indicator is used to indicate whether the network side supports the ISR mechanism. Therefore, the UE may determine whether the current network side supports the ISR mechanism. A method for obtaining the ISR indicator is specifically: in step 201 in the embodiment of the present invention, in the process that the UE executes a routing area update process of the PS domain of the 2G/3G network, the MME sends a routing area update feedback message to the UE, where the routing area update feedback message includes the ISR indicator, and the ISR indicator is used to indicate whether the network side supports the ISR mechanism, and the UE saves the ISR indicator.

It should be noted that, in the embodiment of the present invention, when the UE needs to send or receive data, it may further be determined, at least according to a service type and/or data traffic size included in the data to be sent or received, whether the data sending or receiving needs to be completed in the PS domain of the LTE network. Specifically, the UE determines, according to the service type and/or data traffic size included in the data, whether the LTE network needs to be used. If the LTE network needs to be used, the LTE radio frequency unit is turned on, so as to make the PS domain of the UE camp on the LTE network. If the LTE network does not need to be used, a data sending or receiving process is completed in the PS domain of the 2G/3G network.

The determining, according to the service type and/or data traffic size included in the data, whether the LTE network needs to be used specifically includes:

During the determination that is performed at least according to the service type included in the data, a table of service types needing to use an LTE network may be preset in the UE, or a mark of needing to use an LTE network may be configured in the service type of the data. When the UE needs to send or receive data, the UE may search the preset table of service types needing to use an LTE network according to the service type in the data. If the service type is found, an LTE radio frequency unit is turned on, so as to make the PS domain of the UE camp on the LTE network. Alternatively, the UE may determine, according to the mark in the service type in the data, whether the mark indicates that the LTE network needs to be used. If the LTE network needs to be used, the LTE radio frequency unit is turned on, so as to make the PS domain of the UE camp on the LTE network.

During the determination that is performed at least according to the data traffic size included in the data, a data value may be preset in the UE. When a received or sent data traffic size of the UE is larger than the preset data value, the LTE radio frequency unit is turned on, so as to make the PS domain of the UE camp on the LTE network. When the received or sent data traffic size of the UE is smaller than or equal to the preset data value, the data sending or receiving process is completed in the PS domain of the 2G/3G network.

During the determination that is performed at least according to the service type and the data traffic size included in the data, a table of service types may be preset in the UE. The table includes a mapping relationship between the service type and the data traffic. When the UE needs to send or receive data, the UE determines whether the service type included in the data may be found in the table of service types. If the service type is found in the table of service types, the UE continues to determine whether the data traffic of data to be sent or received is larger than or equal to a data value corresponding to the service type of the data to be sent or received in the table of service types. If the data traffic to be sent or received is larger than or equal to the data value corresponding to the service type of the data to be sent or received in the table of service types, the LTE radio frequency unit is turned on, so as to make the PS domain of the UE camp on the LTE network.

It should be noted that, in the embodiment of the present invention, whether the service type and the data traffic size included in the data need to be determined and specific determination manners are determined according to practical cases, which are not limited here.

It should be noted that, in the embodiment of the present invention, if the UE does not need to send or receive data, or the data sent or received by the UE does not meet the preset condition, the UE stays in the state in which the CS domain and the PS domain both camp on the 2G/3G network, where that the data sent or received by the UE does not meet the preset condition may be that the data traffic size of the sent or received data is smaller than the a preset value, or that the service type of the data is not a service type needing to use an LTE network.

204. If the UE meets a preset second condition, execute the data sending or receiving process in the LTE network.

205. If the UE meets a preset third condition, execute the data sending or receiving process in the 2G/3G network.

In the embodiment of the present invention, after turning on the LTE radio frequency unit, the UE determines whether the UE executes the data sending or receiving process in the LTE network, or executes the data sending or receiving process in the PS domain of the 2G/3G network.

In the embodiment of the present invention, if the UE meets the preset second condition, the UE executes the data sending or receiving process in the LTE network. If the UE meets the preset third condition, the UE executes the data sending or receiving process in the 2G/3G network. That the UE meets the preset second condition may be that the UE sets a state of being attached to the PS domain of the 2G/3G network to be detached, so as to make a network camping state of the UE be updated to that the CS domain camps on the 2G/3G network and the PS domain camps on the LTE network, and the UE executes the data sending or receiving process in the 2G/3G network.

It should be noted that, in the embodiment of the present invention, if that the UE meets the preset second condition is that the UE sets the state of being attached to the PS domain of the 2G/3G network to be detached, so as to make a network camping state of the UE be updated to that the CS domain camps on the 2G/3G network and the PS domain camps on the LTE network, and the UE executes the data sending or receiving process in the 2G/3G network, after the UE completes the data sending or receiving process, the UE performs statistical calculation on the received or sent data traffic of the UE in real time or periodically. When the UE meets a preset first condition again, that is, when the data traffic received or sent within the preset first period of time of the UE is smaller than or equal to the preset first value, or at which data is sent and/or received the average data rate at which the UE sends and/or receives data within the preset second period of time is smaller than or equal to the preset second value, the UE returns to step 201, that is, executes the routing area update process of the PS domain of the 2G/3G network, so as to make the PS domain of the UE camp on the 2G/3G network, and to enable the LTE radio frequency unit to be turned off, thereby reducing power consumption of the UE and improving user experience.

In the embodiment of the present invention, of the state of the UE of being attached to the PS domain of the 2G/3G network is not set to be detached and instead the data sending or receiving process is performed in the case that the camping state of the UE is that the CS domain camps on the 2G/3G network and the PS domain camps on both the LTE network and the 2G/3G network, the UE needs to determine whether to perform the data sending or receiving process in the LTE network or execute the data sending or receiving process in the 2G/3G network. Specifically, if that the UE meets the preset second condition is that the UE sends a service request message to the MME in the LTE network, it is determined that the UE executes the data sending or receiving process in the LTE network. Alternatively, if that the UE meets the preset third condition is that the UE sends the service request message to the SGSN in the 2G/3G network, it is determined that the UE executes the data sending or receiving process in the 2G/3G network, so that the UE may choose whether to execute the data sending or receiving process in the PS domain of the 2G/3G network or in the LTE network, which is more flexible.

In the embodiment of the present invention, when the CS domain of the UE camps on the 2G/3G network and the PS domain camps on the LTE network, and the data traffic sent and/or received by the UE within the preset first period of time is smaller than or equal to the preset first value or the average data at which data is sent and/or received within the preset second period of time is smaller than or equal to the preset second value, the UE executes the routing area update process of the PS domain of the 2G/3G network, and turns off the LTE radio frequency unit to make the CS domain and the PS domain of the UE camp on the 2G/3G network. Therefore, only the 2G/3G radio frequency unit needs to be turned on, and the LTE radio frequency unit is turned on when the UE needs to send or receive data, thereby effectively reducing power consumption of the UE and improving user experience.

Figure 3:
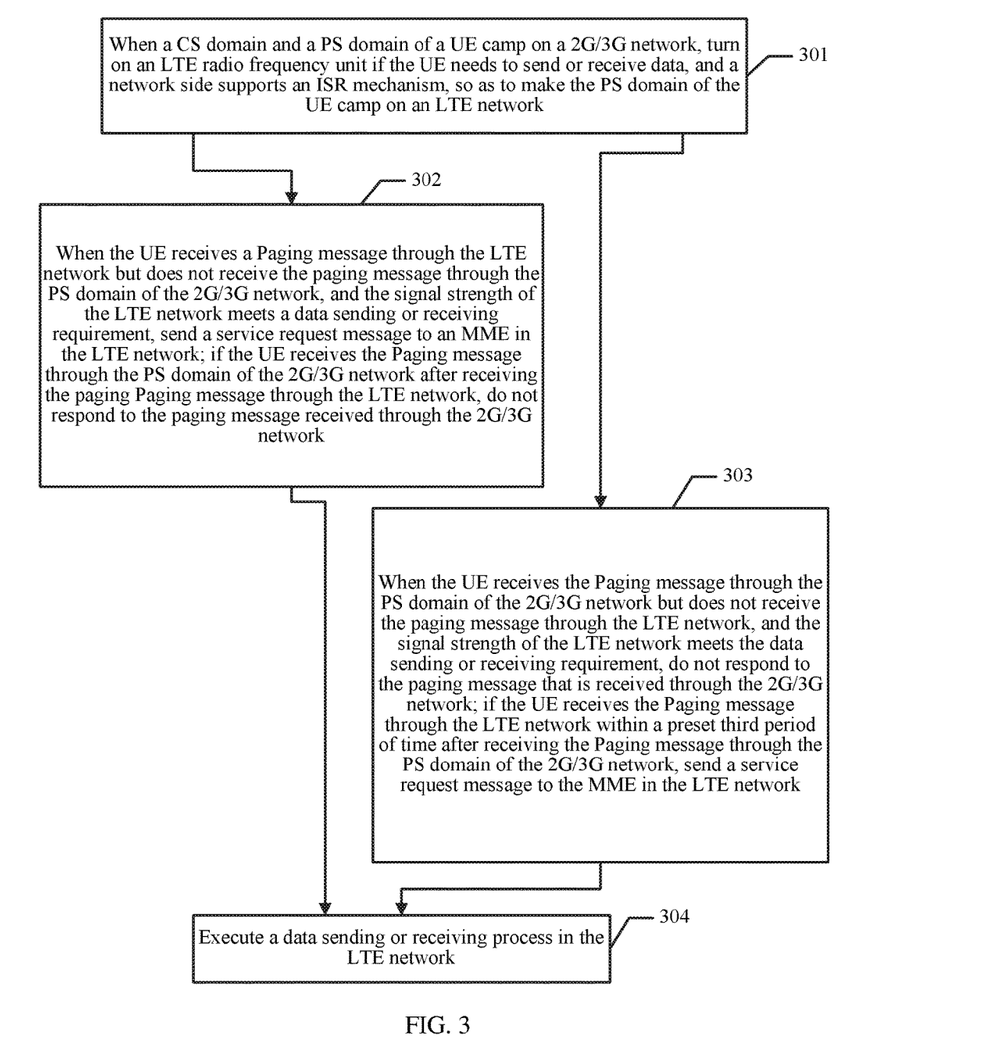
FIG. 3 is a schematic diagram of a data sending or receiving method according to an embodiment of the present invention.

To better understand the technical solution in the embodiment shown in FIG. 2, the following describes in detail an embodiment of a data sending or receiving method in the case that a camping state of a UE is that a CS domain camps on a 2G/3G network and a PS domain camps on both an LTE network and the 2G/3G network. Referring to FIG. 3, FIG. 3 shows a method for the UE to perform data sending or receiving when the UE meets a preset second condition according to the embodiment of the present invention.

301. When the CS domain and the PS domain of the UE camp on the 2G/3G network, turn on an LTE radio frequency unit if the UE needs to send or receive data and a network side supports an ISR mechanism, so as to make the PS domain of the UE camp on the LTE network.

In the embodiment of the present invention, when the CS domain and the PS domain of the UE camp on the 2G/3G network, if the UE needs to send or receive data, and the network side supports the ISR mechanism, the UE turns on the LTE radio frequency unit to make the PS domain of the UE camp on the LTE network. At this time, the CS domain of the UE camps on the 2G/3G network, and the PS domain camps on both the 2G/3G network and the LTE network.

It should be noted that, in the embodiment of the present invention, description is performed by taking the network side supporting the ISR mechanism as an example That is, in the case that the network side supports the ISR mechanism, the UE performs step 301, where the network side supporting the ISR mechanism refers to both the 2G/3G network and the LTE network support the ISR mechanism. In the embodiment of the present invention, if either the 2G/3G network or the LTE network does not support the ISR mechanism, the network side does not support the ISR mechanism. In the case that the network side does not support the ISR mechanism, step 301 is changed to: when the CS domain and the PS domain of the UE camp on the 2G/3G network, if the UE needs to send or receive data, turn on the LTE radio frequency unit, and the UE initiates a tracking area update request to an MME in the LTE network, so as to make the PS domain of the UE camp on the LTE network.

It should be noted that, in the embodiment of the present invention, an ISR indicator is saved in the UE. The ISR indicator is used to indicate whether the network side supports the ISR mechanism. Therefore, the UE may determine whether the current network side supports the ISR mechanism. A method for obtaining the ISR indicator is specifically: in step 201 in the embodiment shown in FIG. 2, in the process that the UE executes a routing area update process of the PS domain of the 2G/3G network, the MME sends a routing area update feedback message to the UE, where the routing area update feedback message includes the ISR indicator, and the ISR indicator is used to indicate whether the network side supports the ISR mechanism, and the UE saves the ISR indicator.

It should be noted that, in the embodiment of the present invention, when the UE needs to send or receive data, it may further be determined, at least according to a service type and/or data traffic size included in the data to be sent or received, whether the data sending or receiving needs to be completed in the PS domain of the LTE network. Specifically, the UE determines, according to the service type and/or data traffic size included in the data, whether the LTE network needs to be used. If the LTE network needs to be used, the LTE radio frequency unit is turned on, so as to make the PS domain of the UE camp on the LTE network. If the LTE network does not need to be used, a data sending or receiving process is completed in the PS domain of the 2G/3G network.

The determining, according to the service type and/or data traffic size included in the data, whether the LTE network needs to be used specifically includes:

During the determination that is performed at least according to the service type included in the data, a table of service types needing to use an LTE network may be preset in the UE, or a mark of needing to use an LTE network may be configured in the service type of the data. When the UE needs to send or receive data, the UE may search the preset table of service types needing to use an LTE network according to the service type in the data. If the service type is found, an LTE radio frequency unit is turned on, so as to make the PS domain of the UE camp on the LTE network. Alternatively, the UE may determine, according to the mark in the service type in the data, whether the mark indicates that the LTE network needs to be used. If the LTE network needs to be used, the LTE radio frequency unit is turned on, so as to make the PS domain of the UE camp on the LTE network.

During the determination that is performed at least according to the data traffic size included in the data, a data value may be preset in the UE. When a received or sent data traffic size of the UE is larger than the preset data value, the LTE radio frequency unit is turned on, so as to make the PS domain of the UE camp on the LTE network. When the received or sent data traffic size of the UE is smaller than or equal to the preset data value, the data sending or receiving process is completed in the PS domain of the 2G/3G network.

During the determination that is performed at least according to the service type and the data traffic size included in the data, the table of service types may be preset in the UE. The table includes a mapping relationship between the service type and the data traffic. When the UE needs to send or receive data, the UE determines whether the service type included in the data may be found in the table of service types. If the service type is found in the table of service types, the UE continues to determine whether the data traffic of the data to be sent or received is larger than or equal to the data value corresponding to the service type of the data to be sent or received in the table of service types. If the data traffic to be sent or received is larger than or equal to the data value corresponding to the service type of the data to be sent or received in the table of service types, the LTE radio frequency unit is turned on, so as to make the PS domain of the UE camp on the LTE network.

It should be noted that, in the embodiment of the present invention, whether the service type and the data traffic size included in the data need to be determined and specific determination manners are determined according to practical cases, which are not limited here.

It should be noted that, in the embodiment of the present invention, if the UE does not need to send or receive data, or the data sent or received by the UE does not meet the preset condition, the UE stays in the state in which the CS domain and the PS domain both camp on the 2G/3G network, where that the data sent or received by the UE does not meet the preset condition may be that the data traffic size of the sent or received data is smaller than the a preset value, or that the service type of the data is not a service type needing to use an LTE network.

302. When the UE receives a Paging message through the LTE network but does not receive the paging message through the PS domain of the 2G/3G network, and the signal strength of the LTE network meets the data sending or receiving requirement, send a service request message to the MME in the LTE network. If the UE receives the Paging message through the PS domain of the 2G/3G network after receiving the Paging message through the LTE network, do not respond to the paging message that is received through the 2G/3G network.

303. When the UE receives the Paging message through the PS domain of the 2G/3G network but does not receive the paging message through the LTE network, and the signal strength of the LTE network meets the data sending or receiving requirement, do not respond to the paging message that is received through the 2G/3G network. If the UE receives the Paging message through the LTE network within a preset third period of time after receiving the Paging message through the PS domain of the 2G/3G network, and sends the service request message to the MME in the LTE network.

304. Execute the data sending or receiving process in the LTE network.

In the embodiment of the present invention, when the CS domain and the PS domain of the UE camp on the 2G/3G network, if the UE needs to send or receive data, and the network side supports the ISR mechanism, the LTE radio frequency unit is turned on, so as to make the PS domain of the UE camp on the LTE network. At this time, a network camping state of the UE is that the CS domain of the UE camps on the 2G/3G network and the PS domain camps on both the 2G/3G network and the LTE network. When the UE receives the Paging message through the LTE network but does not receive the paging message through the PS domain of the 2G/3G network, and the signal strength of the LTE network meets the data sending or receiving requirement, the service request message is sent to the MME in the LTE network. If the UE receives the Paging message through the PS domain of the 2G/3G network after receiving the Paging message through the LTE network, the paging message received through the 2G/3G network is not responded to, so that the UE executes the data sending or receiving process in the LTE network. Alternatively, when the UE receives the Paging message through the PS domain of the 2G/3G network but does not receive the paging message through the LTE network, and the signal strength of the LTE network meets the data sending or receiving requirement, skip responding to the paging message received through the 2G/3G network. If the UE receives the Paging message through the LTE network within a preset third period of time after receiving the Paging message through the PS domain of the 2G/3G network, the service request message is sent to the MME in the LTE network, so that the UE executes the data sending or receiving process in the LTE network.

Figure 4:
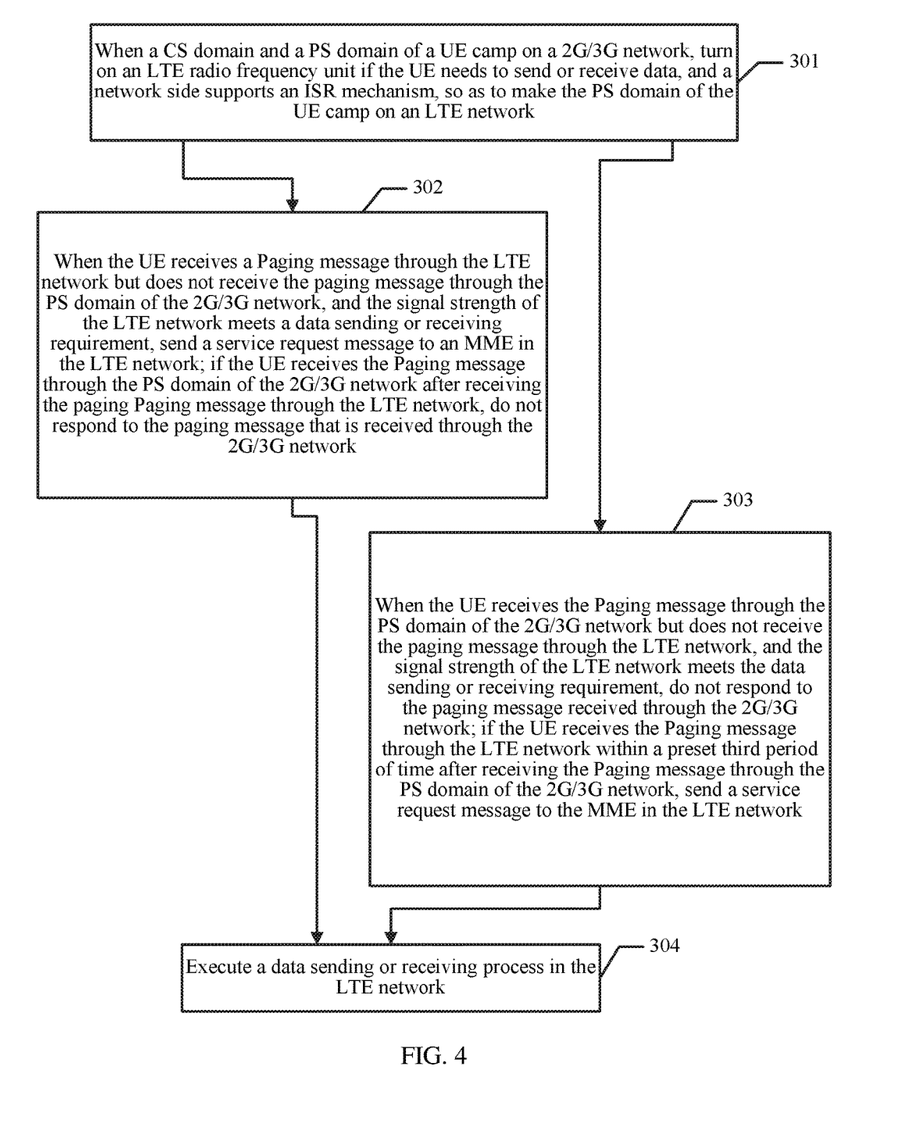
FIG. 4 is another schematic diagram of a data sending or receiving method according to an embodiment of the present invention.

The following describes in detail another embodiment of a data sending or receiving method in the case that a camping state of a UE is that a CS domain camps on a 2G/3G network and a PS domain camps on both an LTE network and a 2G/3G network. Referring to FIG. 4, FIG. 4 shows a method for the UE to perform data sending or receiving when the UE meets a preset third condition according to the embodiment of the present invention, which includes:

401. When the CS domain and the PS domain of the UE camp on the 2G/3G network, turn on an LTE radio frequency unit if the UE needs to send or receive data, and a network side supports an ISR mechanism, so as to make the PS domain of the UE camp on the LTE network.

In the embodiment of the present invention, when the CS domain and the PS domain of the UE camp on the 2G/3G network, if the UE needs to send or receive data, and the network side supports the ISR mechanism, the UE turns on the LTE radio frequency unit to make the PS domain of the UE camp on the LTE network. At this time, the CS domain of the UE camps on the 2G/3G network, and the PS domain camps on both the 2G/3G network and the LTE network.

It should be noted that, in the embodiment of the present invention, description is performed by taking the network side supporting the ISR mechanism as an example That is, in the case that the network side supports the ISR mechanism, the UE performs step 401, where the network side supporting the ISR mechanism refers to both the 2G/3G network and the LTE network support the ISR mechanism. In the embodiment of the present invention, if either the 2G/3G network or the LTE network does not support the ISR mechanism, the network side does not support the ISR mechanism. In the case that the network side does not support the ISR mechanism, step 401 is changed to: when the CS domain and the PS domain of the UE camp on the 2G/3G network, if the UE needs to send or receive data, turn on the LTE radio frequency unit, and the UE initiates a tracking area update request to an MME in the LTE network, so as to make the PS domain of the UE camp on the LTE network.

It should be noted that, in the embodiment of the present invention, an ISR indicator is saved in the UE. The ISR indicator is used to indicate whether the network side supports the ISR mechanism. Therefore, the UE may determine whether the current network side supports the ISR mechanism. A method for obtaining the ISR indicator is specifically: in step 201 in the embodiment shown in FIG. 2, in the process that the UE executes a routing area update process of the PS domain of the 2G/3G network, the MME sends a routing area update feedback message to the UE, where the routing area update feedback message includes the ISR indicator, and the ISR indicator is used to indicate whether the network side supports the ISR mechanism, and the UE saves the ISR indicator.

It should be noted that, in the embodiment of the present invention, when the UE needs to send or receive data, it may further be determined, at least according to a service type and/or data traffic size included in the data to be sent or received, whether the data sending or receiving needs to be completed in the PS domain of the LTE network. Specifically, the UE determines, according to the service type and/or data traffic size included in the data, whether the LTE network needs to be used. If the LTE network needs to be used, the LTE radio frequency unit is turned on, so as to make the PS domain of the UE camp on the LTE network. If the LTE network does not need to be used, a data sending or receiving process is completed in the PS domain of the 2G/3G network.

The determining, according to the service type and/or data traffic size included in the data, whether the LTE network needs to be used specifically includes:

During the determination that is performed at least according to the service type included in the data, a table of service types needing to use an LTE network may be preset in the UE, or a mark of needing to use an LTE network may be configured in the service type of the data. When the UE needs to send or receive data, the UE may search the preset table of service types needing to use an LTE network according to the service type in the data. If the service type is found, an LTE radio frequency unit is turned on, so as to make the PS domain of the UE camp on the LTE network. Alternatively, the UE may determine, according to the mark in the service type in the data, whether the mark indicates that the LTE network needs to be used. If the LTE network needs to be used, the LTE radio frequency unit is turned on, so as to make the PS domain of the UE camp on the LTE network.

During the determination that is performed at least according to the data traffic size included in the data, a data value may be preset in the UE. When a received or sent data traffic size of the UE is larger than the preset data value, the LTE radio frequency unit is turned on, so as to make the PS domain of the UE camp on the LTE network. When the received or sent data traffic size of the UE is smaller than or equal to the preset data value, the data sending or receiving process is completed in the PS domain of the 2G/3G network.

During the determination that is performed at least according to the service type and the data traffic size included in the data, the table of service types may be preset in the UE. The table includes a mapping relationship between the service type and the data traffic. When the UE needs to send or receive data, the UE determines whether the service type included in the data may be found in the table of service types. If the service type is found in the table of service types, the UE continues to determine whether the data traffic of the data to be sent or received is larger than or equal to the data value corresponding to the service type of the data to be sent or received in the table of service types. If the data traffic to be sent or received is larger than or equal to the data value corresponding to the service type of the data to be sent or received in the table of service types, the LTE radio frequency unit is turned on, so as to make the PS domain of the UE camp on the LTE network.

It should be noted that, in the embodiment of the present invention, whether the service type and the data traffic size included in the data need to be determined and specific determination manners are determined according to practical cases, which are not limited here.

It should be noted that, in the embodiment of the present invention, if the UE does not need to send or receive data, or the data sent or received by the UE does not meet the preset condition, the UE stays in the state in which the CS domain and the PS domain both camp on the 2G/3G network, where that the data sent or received by the UE does not meet the preset condition may be that the data traffic size of the sent or received data is smaller than the a preset value, or that the service type of the data is not a service type needing to use an LTE network.

402. When the UE receives a Paging message through the LTE network but does not receive the paging message through the PS domain of the 2G/3G network, and the signal strength of the LTE network does not meet the data sending or receiving requirement, do not respond to the paging message that is received through the LTE network. If the UE receives the Paging message through the PS domain of the 2G/3G network after receiving the Paging message through the LTE network, send a service request message to an SGSN in the 2G/3G network.

403. When the UE receives the Paging message through the PS domain of the 2G/3G network but does not receive the paging message through the LTE network, and the signal strength of the LTE network meets the data sending or receiving requirement, if the UE does not receive the Paging message through the LTE network within a preset third period of time after receiving the Paging message through the PS domain of the 2G/3G network, send the service request message to the SGSN in the 2G/3G network.

404. When the UE receives the Paging message through the PS domain of the 2G/3G network but does not receive the paging message through the LTE network, and the signal strength of the LTE network does not meet the data sending or receiving requirement, send the service request message to the SGSN in the 2G/3G network.

404. Execute the data sending or receiving process in the PS domain of the 2G/3G network.

In the embodiment of the present invention, when the CS domain and the PS domain of the UE camp on the 2G/3G network, if the UE needs to send or receive data, and the network side supports the ISR mechanism, the LTE radio frequency unit is turned on, so as to make the PS domain camp on the LTE network. At this time, a network camping state of the UE is that the CS domain camps on the 2G/3G network and the PS domain camps on both the 2G/3G network and the LTE network. When the UE receives the Paging message through the LTE network but does not receive the paging message through the PS domain of the 2G/3G network, and the signal strength of the LTE network does not meet the data sending or receiving requirement, skip responding to the paging message received through the LTE network. If the UE receives the Paging message through the PS domain of the 2G/3G network after receiving the Paging message through the LTE network, the service request message is sent to the SGSN in the 2G/3G network, so that the UE performs the data sending or receiving process in the PS domain of the 2G/3G network. Alternatively, when the UE receives the Paging message through the PS domain of the 2G/3G network but does not receive the paging message through the LTE network, and the signal strength of the LTE network does not meet the data sending or receiving requirement, the service request message is sent to the SGSN in the 2G/3G network. If the Paging message sent through the LTE network is further received, the paging message sent through the LTE network is not responded to, so that the UE performs the data sending or receiving process in the PS domain of the 2G/3G network.

In the embodiment of the present invention, when the signal strength of the LTE network meets the data sending or receiving requirement, the LTE network is preferentially used to perform the data sending or receiving process.

In the embodiment of the present invention, if the UE sends the service request message to the MME in the LTE network, the UE executes the data sending or receiving process in the LTE network.

In the embodiment of the present invention, if the UE sends the service request message to the SGSN in the 2G/3G network, the UE executes the data sending or receiving process in the 2G/3G network.

In the embodiment of the present invention, the paging message sent through the LTE network is sent by the MME in the LTE network, and the paging message sent through the 2G/3G network is sent by the SGSN in the 2G/3G network.

In the embodiment of the present invention, if the data traffic sent and/or received by the UE within a preset fourth period of time is smaller than a preset third value after the UE completes the data sending or receiving process, the UE turns off the LTE radio frequency unit to make the camping state of the UE be updated to that the CS domain and the PS domain camp on the 2G/3G network, thereby reducing power consumption of the UE and improving user experience.

It should be noted that, in the embodiment of the present invention, if the UE performs the data sending or receiving process in the case that the network camping state is that the CS domain camps on the 2G/3G network and the PS domain camps on the LTE network, after the data sending or receiving process, the UE needs to first execute the routing area update process of the PS domain of the 2G/3G network if the UE meets a preset first condition, so that the LTE radio frequency unit is turned off only after the PS domain of the UE camps on the 2G/3G network, and the routing area update process of the PS domain of the 2G/3G network consumes system resources of the UE. However, if the UE performs the data sending or receiving process in the case that the network camping state is that the CS domain camps on the 2G/3G network and the PS domain camps on both the LTE network and the 2G/3G network, after the data sending or receiving process is completed, when the data traffic sent and/or received by the UE within a preset fourth period of time is smaller than the preset third value, the network camping state of the UE may be updated to that the CS domain and the PS domain camp on the 2G/3G network through turning off the LTE radio frequency unit without performing the routing area update process of the PS domain of the 2G/3G network, thereby saving system resources of the UE.

Figures 5, 6:
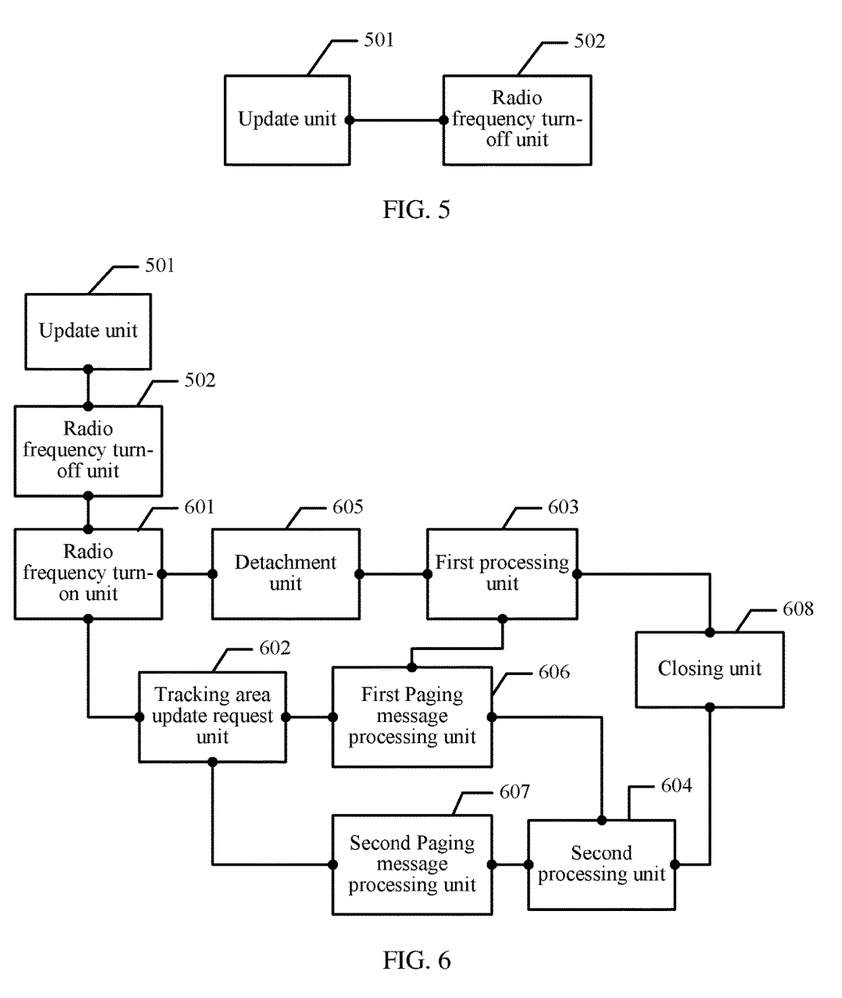
FIG. 5 is a schematic diagram of a user equipment according to an embodiment of the present invention.
FIG. 6 is another schematic diagram of a user equipment according to an embodiment of the present invention.

Referring to FIG. 5, FIG. 5 shows a user equipment according to the embodiment of the present invention, which includes:

An update unit 501 is configured to: when a circuit switched domain CS domain of a UE camps on a second-generation mobile communications technology 2G/third-generation mobile communications technology 3G network and a packet switched domain PS domain camps on a long term evolution LTE network, the UE executes a routing area update process of the PS domain of the 2G/3G network if the UE meets a preset first condition, so as to make the PS domain of the UE camp on the 2G/3G network.

If the first condition is that data traffic sent and/or received within a preset first period of time is smaller than or equal to a preset first value, that the UE meets a preset first condition includes: the data traffic sent and/or received by the UE within the preset first period of time is smaller than or equal to the preset first value; and if the first condition is that an average data at which data is sent and/or received within a preset second period of time is smaller than or equal to a preset second value, that the UE meets a preset first condition includes: at which data is sent and/or received the average data rate at which the UE sends and/or receives data within the preset second period of time is smaller than or equal to the preset second value.

A radio frequency turn-off unit 502 is configured to: after the update unit 501 makes the PS domain of the UE camp on the 2G/3G network, turn off an LTE radio frequency unit.

In the embodiment of the present invention, when the CS domain of the UE camps on the 2G/3G network and the PS domain camps on the LTE network, if the data traffic sent and/or received by the UE within the preset first period of time is smaller than or equal to the preset first value, or at which data is sent and/or received the average data rate at which the UE sends and/or receives data within the preset second period of time is smaller than or equal to the preset second value, the update unit 501 executes the routing area update process of the PS domain of the 2G/3G network, so as to make the PS domain of the UE camp on the 2G/3G network, and the radio frequency turn-off unit 502 turns off the LTE radio frequency unit after the update unit 501 completes the routing area update process, so as to make the CS domain and the PS domain of the UE camp on the 2G/3G network, thereby reducing power consumption of the UE and improving user experience.

To better understand a device in the embodiment of the present invention, referring to FIG. 6, FIG. 6 shows the device for a single card dual standby user equipment to camp on a network according to an embodiment of the present invention, which includes:

the update unit 501 and the radio frequency turn-off unit 502 described in the embodiment shown in FIG. 5.

The update unit 501 is configured to: when a circuit switched domain CS domain of a UE camps on a second-generation mobile communications technology 2G/third-generation mobile communications technology 3G network and a packet switched domain PS domain camps on a long term evolution LTE network, the UE executes a routing area update process of the PS domain of the 2G/3G network if the UE meets a preset first condition, so as to make the PS domain of the UE camp on the 2G/3G network.

The radio frequency turn-off unit 502 is configured to: after the update unit 501 makes the PS domain of the UE camp on the 2G/3G network, turn off an LTE radio frequency unit.

In the embodiment of the present invention, if the first condition is that data traffic sent and/or received within a preset first period of time is smaller than or equal to a preset first value, that the UE meets a preset first condition includes: the data traffic sent and/or received by the UE within the preset first period of time is smaller than or equal to the preset first value. If the first condition is that an average data at which data is sent and/or received within a preset second period of time is smaller than or equal to a preset second value, that the UE meets a preset first condition includes: at which data is sent and/or received the average data rate at which the UE sends and/or receives data within the preset second period of time is smaller than or equal to the preset second value.

In the embodiment of the present invention, the user equipment further includes:

A radio frequency turn-on unit 601, configured to: after the radio frequency turn-off unit 502 turns off the LTE radio frequency unit, turn on the LTE radio frequency unit if the UE needs to send or receive data, and a network side supports an ISR mechanism, so as to make the PS domain of the UE camp on the LTE network; or if the UE needs to send or receive data and the network side does not support the ISR mechanism, turn on the LTE radio frequency unit.

A tracking area update request unit 602 is configured to: if the UE needs to send or receive data and the network side does not support the ISR mechanism, initiate a tracking area update TAU request to an MME in the LTE network after the radio frequency turn-on unit 601 turns on radio frequency, so as to make the PS domain of the UE camp on the LTE network.

A first processing unit 603 is configured to: after the PS domain of the UE camps on the LTE network, execute a data sending or receiving process in the LTE network if the UE meets a preset second condition.

A second processing unit 604 is configured to: after the PS domain of the UE camps on the LTE network, execute the data sending or receiving process in the PS domain of the 2G/3G network if the UE meets a preset third condition.

Preferably, if the UE meets the preset second condition, the user equipment further includes:

a detachment unit 605, and that the UE meets the preset second condition includes:

the detachment unit 605 sets, before the first processing unit 603 executes the data sending or receiving process in the LTE network, a state of being attached to the PS domain of the 2G/3G network to be detached.

Preferably, to make the user equipment meet the preset second condition, the user equipment further includes:

a first Paging message processing unit 606, and that the UE meets the preset second condition includes:

before the first processing unit 603 executes the data sending or receiving process in the LTE network, when the UE receives a Paging message through the LTE network but does not receive the paging message through the PS domain of the 2G/3G network, and the signal strength of the LTE network meets the data sending or receiving requirement, the first Paging message processing unit sends a service request message to the mobility management entity MME in the LTE network; if the UE receives the Paging message through the PS domain of the 2G/3G network after receiving the Paging message through the LTE network, the first Paging message processing unit does not respond to the paging message that is received through the 2G/3G network; or, when the UE receives the Paging message through the PS domain of the 2G/3G network but does not receive the paging message through the LTE network, and the signal strength of the LTE network meets the data sending or receiving requirement, the first Paging message processing unit sends the service request message to the MME in the LTE network if the UE receives the Paging message through the LTE network within a preset third period of time after receiving the Paging message through the PS domain of the 2G/3G network.

Preferably, the user equipment in the embodiment of the present invention further includes:

a second Paging message processing unit 607, and that the UE meets the preset third condition includes:

before the second processing unit 604 executes the data sending or receiving process in the PS domain of the 2G/3G network when the UE receives the Paging message through the LTE network but does not receive the paging message through the PS domain of the 2G/3G network, and the signal strength of the LTE network does not meet the data sending or receiving requirement, the second Paging message processing unit does not respond to the paging message that is received through the LTE network; if the UE receives the Paging message through the PS domain of the 2G/3G network after receiving the Paging message through the LTE network, the second Paging message processing unit sends the service request message to the SGSN in the 2G/3G network; or, when the UE receives the Paging message through the PS domain of the 2G/3G network but does not receive the paging message through the LTE network, and the signal strength of the LTE network meets the data sending or receiving requirement, the service request message is sent to the SGSN in the 2G/3G network if the UE does not receive the Paging message through the LTE network within the preset third period of time after receiving the Paging message through the PS domain of the 2G/3G network; or, when the UE receives the Paging message through the PS domain of the 2G/3G network but does not receive the paging message through the LTE network, and the signal strength of the LTE network does not meet the data sending or receiving requirement, the second Paging message processing unit sends the service request message to the SGSN in the 2G/3G network.

Preferably, the device in the embodiment of the present invention further includes:

a turn-off unit 608, configured to: after the first processing unit 603 or the second processing unit 604 completes the data sending or receiving process, if the data traffic sent and/or received by the UE within a preset fourth period of time is smaller than a preset third value, turn off the LTE radio frequency unit.

In the embodiment of the present invention, when the CS domain of the UE camps on the 2G/3G network and the PS domain camps on the LTE network, the update unit 501 executes the routing area update process of the PS domain of the 2G/3G network if the data traffic sent and/or received by the UE within the preset first period of time is smaller than or equal to the preset first value, or at which data is sent and/or received the average data rate at which the UE sends and/or receives data within the preset second period of time is smaller than or equal to the preset second value, so as to make the PS domain of the UE camp on the 2G/3G network, and the radio frequency turn-off unit 502 turns off the LTE radio frequency unit after the update unit 501 completes the routing area update process, so as to make the CS domain and the PS domain of the UE camp on the 2G/3G network, thereby reducing power consumption of the UE and improving user experience.

After the radio frequency turn-off unit 502 turns off the LTE radio frequency unit, if the UE needs to send or receive data, and the network side supports the ISR mechanism, the radio frequency turn-on unit 601 turns on the LTE radio frequency unit to make the PS domain of the UE camp on the LTE network; at this time, a network camping state of the UE is that the CS domain camps on the 2G/3G network and the PS domain camps on both the 2G/3G network and the LTE network; after the radio frequency turn-on unit 601 turns on the LTE radio frequency, the first processing unit 603 executes the data sending or receiving process in the LTE network; or, after the radio frequency turn-off unit 502 turns off the LTE radio frequency unit, the radio frequency turn-on unit 601 turns on the LTE radio frequency unit, and the tracking area update request unit 602 initiates the tracking area update TAU request to the MME in the LTE network if the UE needs to send or receive data and the network side does not support the ISR mechanism, so as to make the PS domain of the UE camp on the LTE network; at this time, the network camping state of the UE is that the CS domain camps on the 2G/3G network and the PS domain camps on both the 2G/3G network and the LTE network; after the tracking area update request unit 602 completes the routing area update, if the UE meets the preset second condition, the first processing unit 603 executes the data sending or receiving process in the LTE network; if the UE meets the preset third condition, the second processing unit 604 executes the data sending or receiving process in the 2G/3G network; and after the first processing unit 603 or the second processing unit 604 completes the data sending or receiving process, the turn-off unit 608 turns off the LTE radio frequency unit if the data traffic sent and/or received by the UE within a preset fourth period of time is smaller than the preset third value.

That the UE meets the preset second condition includes: before the first processing unit 603 executes the data sending or receiving process in the LTE network, when the UE receives a Paging message through the LTE network but does not receive the paging message through the PS domain of the 2G/3G network, and the signal strength of the LTE network meets the data sending or receiving requirement, the first Paging message processing unit 606 sends a service request message to the mobility management entity MME in the LTE network; if the UE receives the Paging message through the PS domain of the 2G/3G network after receiving the Paging message through the LTE network, the first Paging message processing unit 606 does not respond to the paging message that is received through the 2G/3G network; or, when the UE receives the Paging message through the PS domain of the 2G/3G network but does not receive the paging message through the LTE network, and the signal strength of the LTE network meets the data sending or receiving requirement, if the UE receives the Paging message through the LTE network within a preset third period of time after receiving the Paging message through the PS domain of the 2G/3G network, the first Paging message processing unit 606 sends the service request message to the MME in the LTE network.

That the UE meets the preset third condition includes: before the second processing unit 604 executes the data sending or receiving process in the PS domain of the 2G/3G network, when the UE receives the Paging message through the LTE network but does not receive the paging message through the PS domain of the 2G/3G network, and the signal strength of the LTE network does not meet the data sending or receiving requirement, the second Paging message processing unit 607 does not respond to the paging message that is received through the LTE network; if the UE receives the Paging message through the PS domain of the 2G/3G network after receiving the Paging message through the LTE network, the second Paging message processing unit 607 sends the service request message to the SGSN in the 2G/3G network; or, when the UE receives the Paging message through the PS domain of the 2G/3G network but does not receive the paging message through the LTE network, and the signal strength of the LTE network meets the data sending or receiving requirement, if the UE does not receive the Paging message through the LTE network within the preset third period of time after receiving the Paging message through the PS domain of the 2G/3G network, the second Paging message processing unit 607 sends the service request message to the SGSN in the 2G/3G network; or, when the UE receives the Paging message through the PS domain of the 2G/3G network but does not receive the paging message through the LTE network, and the signal strength of the LTE network does not meet the data sending or receiving requirement, the second Paging message processing unit 607 sends the service request message to the SGSN in the 2G/3G network.

It should be noted that, in the embodiment of the present invention, the user equipment further includes the LTE radio frequency unit and a 2G/3G radio frequency unit, where the LTE radio frequency unit and the 2G/3G radio frequency unit are both used for data sending or receiving. The LTE radio frequency unit turns off the power and stays turned off when being triggered by the radio frequency turn-off unit 502 or the turn-off unit 608, and turns on the power and stays turned on when being triggered by the radio frequency turn-on unit 601.

In the embodiment of the present invention, when the CS domain of the UE camps on the 2G/3G network and the PS domain camps on the LTE network, and the data traffic sent and/or received by the UE within the preset first period of time is smaller than or equal to the preset first value or the average data at which data is sent and/or received within the preset second period of time is smaller than or equal to the preset second value, the UE executes the routing area update process of the PS domain of the 2G/3G network, and turns off the LTE radio frequency unit to make the CS domain and the PS domain of the UE camp on the 2G/3G network. Only a 2G/3G radio frequency needs to be turned on, thereby effectively reducing power consumption of the UE and improving user experience.

A person of ordinary skill in the art may understand that all or a part of the steps of the methods in the foregoing embodiments may be implemented by a program instructing relevant hardware. The program may be stored in a computer readable storage medium. The storage medium may be a read-only memory, a magnetic disk, or an optical disc.

The foregoing describes in detail a method for a single card dual standby user equipment to camp on a network and a user equipment provided by the present invention. A person of ordinary skill in the art can make variations and modifications to the present invention in terms of the specific implementations and application scopes according to the ideas of the present invention. Therefore, the specification shall not be construed as a limit to the present invention.

What is claimed is:

1. A method for a single card dual standby user equipment (UE) to camp on a network, comprising:

when a circuit switched (CS) domain of a UE camps on a second-generation mobile communications technology (2G)/third-generation mobile communications technology (3G) network and a packet switched (PS) domain camps on a long term evolution (LTE) network, executing, by the UE, a routing area update process of the PS domain of the 2G/3G network when the UE meets a preset first condition, so as to make the PS domain of the UE camp on the 2G/3G network; and after the PS domain of the UE camps on the 2G/3G network, turning off an LTE radio frequency processor, after the turning off an LTE radio frequency processor, further comprising:

when the UE needs to send or receive data, and a network side supports an idle mode signaling reduction (ISR) mechanism, turning on the LTE radio frequency processor to make the PS domain of the UE camp on the LTE network;

when the UE meets a preset second condition, executing a data sending or receiving process in the LTE network; and when the UE meets a preset third condition, executing a data sending or receiving process in the PS domain of the 2G/3G network, wherein, that the UE meets a preset second condition further comprises:

when the UE receives a Paging message through the LTE network but does not receive the Paging message through the PS domain of the 2G/3G network, and signal strength of the LTE network meets the data sending or receiving requirement, sending a service request message to the MME in the LTE network; and when the UE receives the Paging message through the PS domain of the 2G/3G network after receiving the Paging message through the LTE network, skipping responding to the Paging message that is received through the 2G/3G network; and when the UE receives the Paging message through the PS domain of the 2G/3G network but does not receive the Paging message through the LTE network, and the signal strength of the LTE network meets the data sending or receiving requirement, skipping responding to the Paging message that is received through the 2G/3G network; and when the UE receives the Paging message through the LTE network within a preset third period of time after receiving the Paging message through the PS domain of the 2G/3G network, sending a service request message to the MME in the LTE network.

2. A method for a single card dual standby user equipment (UE) to camp on a network, comprising:

when a circuit switched (CS) domain of a UE camps on a second-generation mobile communications technology (2G)/third-generation mobile communications technology (3G) network and a packet switched (PS) domain camps on a long term evolution (LTE) network, executing, by the UE, a routing area update process of the PS domain of the 2G/3G network when the UE meets a preset first condition, so as to make the PS domain of the UE camp on the 2G/3G network; and after the PS domain of the UE camps on the 2G/3G network, turning off an LTE radio frequency processor, after the turning off an LTE radio frequency processor, further comprising:

when the UE needs to send or receive data, and a network side supports an idle mode signaling reduction (ISR)

mechanism, turning on the LTE radio frequency processor to make the PS domain of the UE camp on the LTE network;

when the UE meets a preset second condition, executing a data sending or receiving process in the LTE network; and when the UE meets a preset third condition, executing a data sending or receiving process in the PS domain of the 2G/3G network, wherein, that the UE meets a preset third condition comprises:

when the UE receives a Paging message through the LTE network but does not receive the Paging message through the PS domain of the 2G/3G network, and the signal strength of the LTE network does not meet the data sending or receiving requirement, skipping responding to the Paging message that is received through the LTE network; and when the UE receives the Paging message through the PS domain of the 2G/3G network after receiving the Paging message through the LTE network, sending a service request message to a serving general packet radio service support node (SGSN) in the 2G/3G network;

when the UE receives the Paging message through the PS domain of the 2G/3G network but does not receive the Paging message through the LTE network, and the signal strength of the LTE network meets the data sending or receiving requirement, when the UE does not receive the Paging message through the LTE network within a preset third period of time after receiving the Paging message through the PS domain of the 2G/3G network, sending a service request message to the SGSN in the 2G/3G network; and when the UE receives the Paging message through the PS domain of the 2G/3G network but does not receive the Paging message through the LTE network, and the signal strength of the LTE network does not meet the data sending or receiving requirement, sending a service request message to the SGSN in the 2G/3G network.

3. A user equipment (UE), comprising:

a memory; and a first processor coupled to the memory and configured to:

when a circuit switched (CS) domain of a UE camps on a second-generation mobile communications technology (2G)/third-generation mobile communications technology (3G) network and a packet switched (PS) domain camps on a long term evolution (LTE) network, execute a routing area update process of the PS domain of the 2G/3G network when the UE meets a preset first condition, so as to make the PS domain of the UE camp on the 2G/3G network; and after the first processor makes the PS domain of the UE camp on the 2G/3G network, turn off an LTE radio frequency processor, after the first processor turns off the LTE radio frequency processor, turn on the LTE radio frequency processor when the UE needs to send or receive data and a network side supports an idle mode signaling reduction (ISR) mechanism, so as to make the PS domain of the UE camp on the LTE network; or when the UE needs to send or receive data and the network side does not support the ISR mechanism, turn on the LTE radio frequency processor;

when the UE needs to send or receive data and the network side does not support the ISR mechanism, initiate a tracking area update (TAU) request to a mobility management entity (MME) in the LTE network after the first processor turns on a radio frequency processor, so as to make the PS domain of the UE camp on the LTE network;

a second processor, configured to: after the PS domain of the UE camps on the LTE network, execute a data sending or receiving process in the LTE network when the UE meets a preset second condition; and a third processor, configured to: after the PS domain of the UE camps on the LTE network, execute a data sending or receiving process in the PS domain of the 2G/3G network when the UE meets a preset third condition.

4. The user equipment according to claim 3, wherein, the preset first condition is that data traffic sent and/or received within a preset first period of time is smaller than or equal to a preset first value, or the preset first condition is that an average data at which data is sent and/or received within a preset second period of time is smaller than or equal to a preset second value; and that the UE meets a preset first condition comprises:

the data traffic sent and/or received by the UE within the preset first period of time is smaller than or equal to the preset first value, or at which data is sent and/or received the average data rate at which the UE sends and/or receives data within the preset second period of time is smaller than or equal to the preset second value.

5. The user equipment according to claim 3, further comprising: a detacher;

wherein, that the UE meets a preset second condition comprises:

setting, by the first processor, a state of being attached to the PS domain of the 2G/3G network to be detached.

6. The user equipment according to claim 3, further comprising: a first Paging message processor;

wherein, that the UE meets the preset second condition comprises:

before the second processor executes the data sending or receiving process in the LTE network, when the UE receives a Paging message through the LTE network but does not receive the Paging message through the PS domain of the 2G/3G network, and signal strength of the LTE network meets the data sending or receiving requirement, the first Paging message processor sends a service request message to the MME in the LTE network; when the UE receives the Paging message through the PS domain of the 2G/3G network after receiving the Paging message through the LTE network, the first Paging message processor skips responding to the Paging message that is received through the 2G/3G network; or, when the UE receives the Paging message through the PS domain of the 2G/3G network but does not receive the Paging message through the LTE network, and the signal strength of the LTE network meets the data sending or receiving requirement, the first Paging message processor sends a service request message to the MME in the LTE network when the UE receives the Paging message through the LTE network within a preset third period of time after receiving the Paging message through the PS domain of the 2G/3G network, so as to make the second processor execute the data sending or receiving process in the LTE network.

7. The user equipment according to claim 3, further comprising: a second Paging message processor;

wherein, that the UE meets the preset third condition comprises:

before the third processor executes the data sending or receiving process in the PS domain of the 2G/3G network, when the UE receives the Paging message through the LTE network but does not receive the Paging message through the PS domain of the 2G/3G network, and the signal strength of the LTE network does not meet the data sending or receiving requirement, the second Paging message processor skips responding to the Paging message that is received through the LTE network; when the UE receives the Paging message through the PS domain of the 2G/3G network after receiving the Paging message through the LTE network, the second Paging message processor sends the service request message to a serving general packet radio service support node SGSN in the 2G/3G network; or, when the UE receives the Paging message through the PS domain of the 2G/3G network but does not receive the Paging message through the LTE network, and the signal strength of the LTE network meets the data sending or receiving requirement, the second Paging message processor sends the service request message to the SGSN in the 2G/3G network when the UE does not receive the Paging message through the LTE network within the preset third period of time after receiving the Paging message through the PS domain of the 2G/3G network; or, when the UE receives the Paging message through the PS domain of the 2G/3G network but does not receive the Paging message through the LTE network, and the signal strength of the LTE network does not meet the data sending or receiving requirement, the second Paging message processor sends the service request message to the SGSN in the 2G/3G network, so as to make the third processor execute the data sending or receiving process in the 2G/3G network.

8. The user equipment according to claim 3, further comprising:
after the second processor or the third processor completes the data sending or receiving process, when the data traffic sent and/or received by the UE within a preset fourth period of time is smaller than a preset third value, turn off the LTE radio frequency processor.

* * * * *